United States Patent [19]

Hughes et al.

[11] 3,800,506

[45] Apr. 2, 1974

[54] PROCESS

[75] Inventors: Robert D. Hughes; Edward F. Steigelmann, both of Park Forest, Ill.

[73] Assignee: Standard Oil Company, Chicago, Ill.

[22] Filed: Aug. 23, 1972

[21] Appl. No.: 282,932

[52] U.S. Cl. .................................................. 55/16
[51] Int. Cl. .......................................... B01d 53/22
[58] Field of Search ............................. 55/16, 158

[56] References Cited
UNITED STATES PATENTS

| | | | |
|---|---|---|---|
| 3,396,510 | 8/1968 | Wald et al. | 55/16 |
| 3,447,286 | 6/1969 | Dounoucas | *55/16 |
| 3,566,580 | 3/1971 | Li | 55/16 |

*Primary Examiner*—Charles N. Hart

[57] ABSTRACT

There is described the separation of aliphatically-unsaturated hydrocarbons from gaseous mixtures by the combined use of flooded-cell, liquid barrier permeation and metal complexing techniques. The liquid barrier is disposed as a continuous, distinct or separate liquid phase in contact with a film membrane composite, and the barrier contains complex-forming metal ions in aqueous solution. The film is composed of a hydrophobic membrane having a hydrophilic surface on its feed inlet side. The hydrocarbon feed gas is contacted with the liquid barrier and the presence of the hydrophilic surface on the feed inlet side of the hydrophobic film membrane serves to improve the selectivity of the separation. The metal ions in the liquid barrier may be, for example, noble metal, nickel, mercurous, cuprous or other metal ions, and mixtures of metal ions, with or without other cations, may be used. The separation of ethylene from ethane and methane is of particular interest.

19 Claims, No Drawings

PROCESS

This invention relates to the separation of aliphatically-unsaturated hydrocarbons from gaseous mixtures containing the hydrocarbons to be separated, along with other material. More particularly, this invention is concerned with the separation of aliphatically-unsaturated hydrocarbons by the combined use of flooded-cell, liquid barrier permeation and metal complexing techniques. The selectivity of the separation is enhanced by employing a liquid barrier solution of complex-forming metal ions adjacent a film membrane composite comprised of a hydrophobic film having a hydrophilic surface or covering on its feed inlet side in contact with the barrier solution. The invention is especially useful for separating ethylene from gaseous mixtures containing it, other hydrocarbons, for example, one or both of ethane and methane, and with or without hydrogen.

There is considerable commercial interest in separating various aliphatically-unsaturated hydrocarbons from mixtures containing them. These unsaturated hydrocarbons are reactive materials that serve in various roles, generally as intermediates in chemical syntheses. A number of the unsaturated hydrocarbons are employed as monomers in the formation of polymers and in this regard, olefins such as ethylene, propylene, butadiene and isoprene are well known. These olefins, as well as other unsaturated materials, for instance, acetylene, are also used to form relatively low molecular weight products.

The aliphatically-unsaturated hydrocarbons are most often available on a commercial basis in admixture with other chemical compounds, frequently other hydrocarbons. These unsaturated hydrocarbon-containing streams are usually by-products of chemical syntheses or separation processes. When the hydrocarbon streams are liquid under normal conditions or can readily be made so, ordinary distillation techniques can be used to separate the hydrocarbon components providing they have sufficiently different boiling points for the process to be economically feasible. Especially when the hydrocarbon mixtures contain materials having close boiling points, which is often the case with hydrocarbons of the same number of carbon atoms or having a difference of only one carbon atom, distillation may not be an attractive separation procedure. In such cases, more costly processes are often used and involve operations such as solvent extraction or extractive distillation which entail considerable expense, if indeed they are technically feasible in a given situation.

When the mixture containing the aliphatically-unsaturated hydrocarbon is in an essentially gaseous state at normal or ambient conditions of temperature and pressure, separation of the desired component from the mixture may be even more troublesome. In these situations, cryogenic processes may be used, but they are expensive. The components of these normally gaseous mixtures may not even have particularly close boiling points, but nevertheless the mixture must be cooled in order to separate one or more of its components. In spite of the considerable cost of cryogenic operations, the procedure has been employed commercially for the separation of ethylene from other gaseous materials such as ethane and methane.

Our copending patent application Ser. No. 252,607, filed May 12, 1972, U.S. Pat. No. 3,758,603, is directed to a method for separating aliphatically-unsaturated hydrocarbons from mixtures containing them, and involves the combined use of liquid barrier permeation and metal complexing techniques which can exhibit high selectivity factors. In the process the liquid barrier is an aqueous solution containing metal ions which will complex with the aliphatically-unsaturated hydrocarbon to be separated. In one form of the system, the liquid barrier is disposed as a continuous, distinct or separate liquid phase adjacent to and in contact with a semi-permeable film membrane which is relatively non-selective with respect to passage of the components of the hydrocarbon feed mixture. Consequently, should the feed mixture contact the non-selective film forming the outlet or exhaust side for the unsaturated hydrocarbon separated, there is a tendency for all of the feed gas components to pass through the film and thereby contaminate the product and lower the selectivity of the separation.

Among the semi-permeable film membranes which can be used in this type of separation procedure are ones that are essentially hydrophobic in nature or have poor surface-wetting characteristics with respect to the aqueous solution of complex-forming metal ions. We have found that the selectivity these films exhibit when used in the separation procedure may be significantly decreased due to the hydrocarbon feed gas passing through the liquid barrier and contacting the inlet surface of the film membrane. Since the film itself shows little, if any, selectivity in favor of the passage of unsaturated hydrocarbons, contact of the feed gas or any of its components with the film results in these materials being present in greater amounts in the product stream removed from the outlet side of the film. The use of hydrophobic films is, however, desirable due to their ready availability, resistance to attack by the aqueous medium employed good strength and lower cost in some instances. In the present invention, an increase in the selectivity of the essentially hydrophobic film membrane when used in a flooded-cell system for separating unsaturated hydrocarbons, is provided by having a hydrophilic surface on the inlet side of the hydrophobic film. This surface apparently serves to reduce contact between the gaseous feed and the hydrophobic film, thereby enhancing the effectiveness of the separation.

The hydrophilic surface can be formed on or be adjacent to the inlet surface of the hydrophobic film, and thus the hydrophilic surface may be, and preferably is, in contact with the hydrophobic film. The hydrophilic coating may be formed on the surface of the hydrophobic film by, for instance, coating the hydrophilic film on the hydrophobic substrate. The hydrophilic coating may not exhibit any significant amount of selective permeability to any component of the gaseous hydrocarbon feed, and the separation of the aliphatically-unsaturated hydrocarbon results primarily from the functioning of the aqueous liquid barrier containing the complex forming metal ions.

The hydrophobic film membranes employed in the process of this invention are of the essentially solid, water-insoluble, semi-permeable type. The film is not adequately selective with respect to passage of or permeation by the aliphatically-unsaturated hydrocarbon to perform the desired separation, and often, the film is permeable to essentially all of the components in the feedstock employed in this invention when they are in the gaseous phase. However, by having the film in contact with sufficient aqueous liquid to form a barrier, the physical passage of gas through the film is reduced or prevented, and the components of the feed stream must therefore traverse the separation zone primarily by becoming part of and then being separated from the aqueous liquid phase. Thus, in the absence of the complexing metal ion in the aqueous medium, there could be a slight separation of hydrocarbons effected by the use of water as the liquid medium since the individual hydrocarbons may exhibit differing solubilities in water. In the method of the present invention, however, the selectivity of the separation of aliphatically-unsaturated hydrocarbons is greatly increased due to the presence of the complexing metal ions in the aqueous barrier medium contacting the film.

The hydrophobic film membranes which can be employed in this invention serve to prevent the passage of significant amounts of liquid complexing solution through the film under the conditions at which the operation is conducted, and the film may be essentially unreactive with the complexing ions in the liquid barrier. The films can be readily made and some are commercially available. The film membrane may be self-supporting and have sufficient strength not to require any additional supporting material on either of its sides during use. With some films, however, it is necessary or advantageous to provide adequate support such as additional film or sheet-like materials on one or both sides of the film membrane. These supporting structures are frequently very thin materials and are usually permeable to both liquids and gases and may not serve a separating function with respect to any component of the feed stream.

The hydrophobic film membrane may be in any desirable physical shape. Flat film sheets are one usable form, although greater surface areas and more efficient separation may be provided by using tubular fibers of the types disclosed in, for instance, U. S. Pat. No. 3,228,877, herein incorporated by reference. This patent describes a variety of hydrophobic membranes which may be employed in the present invention, for example, polyamides, polyvinyl chlorides, olefin polymers such as polyethylene, polypropylene, and ethylene-propylene copolymers; acrylic ester polymers; organic silicone polymers; polyurethanes; polystyrenes and the like. Suitable hydrophobic membranes are described in "Gas Permeability of Plastics," Major et al., *Modern Plastics*, page 135 et. seq., July, 1962; and U.S. Pat. Nos. 3,133,132; 3,133,137; 3,256,675; 3,274,750; 3,325,330; 3,335,545, 3,396,510 and 3,447,286, all incorporated herein by reference. The film membranes may often have a thickness up to about 10 mils or more, and it is preferred to employ membranes having a thickness up to about 1 mil or even up to about 5 mils. The film must have sufficient thickness to avoid rupture at the pressure employed, and often the films may have a thickness of at least about 0.001 mil. A material, i.e., the film membrane employed in this invention, can be considered to be hydrophobic when by immersion in distilled water for one day at room temperature and pressure, i.e., 20° C. and one atmosphere, it absorbs less than 5 weight percent water based on the original weight of the material, preferably less than about 3 weight percent.

The hydrophilic surface on the feed inlet side of the hydrophobic membrane includes the known materials of this type. Thus, the surfaces or coatings are essentially solid and water-insoluble, at least when cured. The hydrophilic surfaces are generally permeable to the gaseous hydrocarbon feeds used in the system of this invention. The surfaces may or may not be permeable to the aqueous liquid barrier. The hydrophilic surface is generally not more than a few mils thick, often being less than about 10 mils thick and preferably up to about 1 mil in thickness. The hydrophilic surface may not cover the entire inlet surface of the hydrophobic film employed to effect the desired separation, but generally, as the coverage increases, the selectivity of the separation is greater. Preferably, the major amount and even essentially all of the effective inlet surface of the hydrophobic film is covered with the hydrophilic surface.

Hydrophilic materials suitable for use in accordance with this invention are disclosed in U. S. Pat. Nos. 3,228,877 and 3,566,580, as well as in other prior disclosure listed above. The hydrophilic coatings may be cellulose nitrates or esters of the lower aliphatic fatty acids, say the acids having up to about 3 carbon atoms; cellulose derivatives such as the cellulose ethers and regenerated cellulose; polyvinyl alcohols and esters; polyesters; polyglycols; polyamides; polysaccharides; and acrylonitrile polymers. Among these hydrophilic materials are polyethylene glycol terephthalate, carboxymethyl cellulose, polyacrylates, polymethacrylates, polysulfonates such as polystyrene sulfonates, and polyethylene oxide and copolymers thereof, e.g., with polypropylene oxide. A material, i.e., the surface in contact with the film membrane employed in this invention can be considered to be hydrophilic when by immersion in distilled water for one day at room temperature and pressure, i.e., 20° C. and one atmosphere, it absorbs at least 5, preferably at least 6, weight percent water based on the original weight of the material.

The method of this invention can be employed alone to separate one or more unsaturated hydrocarbons, or it may be used in conjunction with other separating steps, for instance, a cryogenic operation, and still be economically advantageous compared with an all-cryogenic system. Although the aliphatically-unsaturated hydrocarbon product provided by the method of this invention may be a quite pure material, for instance, of greather than 99 percent purity, the separation procedure may be used merely to provide a significant increase in the concentration of a given aliphatically-unsaturated hydrocarbon in a mixture with other components of the feedstock.

The process of this invention can be employed to separate various aliphatically-unsaturated hydrocarbons from other ingredients of the feed mixture providing at least one of the aliphatically-unsaturated hydrocarbons exhibits a transfer rate across the liquid barrier that is greater than at least one other dissimilar component of the feedstock. Quite advantageously, the system can be used to separate aliphatically-unsaturated hydrocarbons from other hydrocarbons which may be aliphatically-saturated or unsaturated, or from non-hydrocarbon materials, including fixed gases such as hydrogen. The feed mixture may thus contain one or more paraffins, including cycloparaffins, mono or polyolefins, which may be cyclic or acyclic, and acetylenes or alkynes, and the mixture may include aromatic structures having such aliphatic configurations in a portion of their structure. Often, the feed mixture contains one or more other hydrocarbons having the same number of carbon atoms as the unsaturated hydrocarbon to be separated or only a one carbon atom difference. Among the materials which may be separated according to this invention are ethylene, propylene, butenes, butadiene, isoprene, acetylene and the like.

In flooded-cell operations of this invention the liquid barrier can be formed by using the semi-permeable membrane to immobilize the liquid barrier as a distinct, separate, continuous liquid phase adjacent to the feed side of the membrane composite. The gaseous feedstock can then be contacted with the liquid layer. The liquid barrier is preferably sufficiently thick so that the hydrocarbon feed gas can be passed into the layer of liquid without being in immediate or excessive contact with the film to a material extent. Accordingly, there is little, if any, passage for the gaseous feedstock across the separation zone except by becoming part of the liquid barrier phase, and thus this barrier controls the selectivity of the liquid barrier-semi-permeable membrane combination.

The liquid barrier contains sufficient water-soluble metal ions to form a suitable complex with at least one aliphatically-unsaturated hydrocarbon component of the gaseous feed. The metal ions readily form the complex upon contact with the gaseous feed, and, in addition, the complex dissociates back to the metal ion and an aliphatically-unsaturated hydrocarbon component of the complex, under the conditions which exist at the discharge side of the liquid barrier and semi-permeable membrane composite as employed in this invention. The released aliphatically-unsaturated hydrocarbons exit the discharge side of the membrane and can be removed from the vicinity of the membrane as by a sweep gas or through the effect of vacuum on this side of the membrane. Thus, the unsaturated hydrocarbon-metal complex forms and is decomposed upon its travel through the metal ion-containing liquid barrier, and as a result, the material passing through the barrier is more concentrated with respect to at least one aliphatically-unsaturated hydrocarbon component present in the feed stream.

Often the reactivity of aliphatically-unsaturated hydrocarbons with the complexing metal ions in their order of decreasing activity goes from acetylenes or dienes to monoolefins, the aliphatically-saturated hydrocarbons and other materials present being essentially non-reactive. Also, different reactivities may be exhibited among the various members of a given type of aliphatically-unsaturated hydrocarbons. The process of this invention can thus be used to separate paraffins from monoolefins, diolefins or acetylenes; diolefins from monoolefins; or acetylenes from paraffins, monoolefins or diolefins; as well as, to separate a given aliphatically-unsaturated hydrocarbon from another of such materials in the same class providing the members have differing transport rates across the liquid barrier. The feed gas need only contain a small amount of aliphatically-unsaturated hydrocarbon, as long as the amount is sufficient so that the unsaturated material to be separated selectively reacts with the metal complex ions to a significant extent, and thus at least one other component of the feed is less reactive or non-reactive with the complex-forming metal ions. The aliphatically-unsaturated materials of most interest with regard to separation by the method of the present invention, have 2 to about 8 carbon atoms, preferably 2 to 4 carbon atoms. The separation of ethylene or propylene from admixtures with other normally gaseous materials, such as one or more of ethane, methane, propane and hydrogen, is of particular importance. Frequently, these feed mixtures contain about 1 to 50 weight percent ethylene, about 0 to 50 weight percene ethane and about 0 to 50 weight percent methane. Another process that may be of special significance is the separation from ethylene of minor amounts of acetylene.

The partial pressure of the aliphatically-unsaturated component of the gaseous feed at its charged or input side of the liquid barrier used in the present invention is greater than the partial pressure of this unsaturated component on the discharge or exit side of the liquid barrier and semi-permeable film composite. The partial pressure drop of the unsaturated hydrocarbon may often be at least about 0.5 pound per square inch, and is preferably at least about 20 psi, although the pressure drop should not be so great that the membrane is ruptured or otherwise deleteriously affected to a significant extent. Conveniently, the total pressure of the gaseous feed is up to about 1,000 pounds per square inch. The discharge partial pressure of the unsaturated hydrocarbon can preferably be controlled by subjecting the exit side of the membrane to the action of a sweep gas that is essentially inert to forming a complex with the metal ions of the aqueous liquid barrier. The sweep gas picks up the discharged aliphatically-unsaturated components, and the sweep gas may be selected so that it can be readily separated from the aliphatically-unsaturated hydrocarbon material if that be indicated for subsequent use of the unsaturated hydrocarbon separated. Unless a reaction with the separated hydrocarbon is desired, the sweep gas should be relatively inert therewith and may be, for instance, butane, carbon dioxide or the like.

The temperature across the liquid barrier-semipermeable film composite employed in the method of this invention can be essentially constant or it may vary, and decomposition of the metal-unsaturated hydrocarbon complex can be effected primarily by the drop in partial pressure of the aliphatically-unsaturated hydrocarbon on the exit side of the liquid barrier-semipermeable film combination compared with that on the feed side. Conveniently, the temperature of the liquid barrier may be essentially ambient, especially in the case of feedstocks that are gaseous at this temperature and the pressure employed on the feed side of the liquid barrier. The temperature of the liquid barrier may, however, be reduced or elevated from ambient temperature. Often, the temperature may be up to about 100° C., and elevated temperatures may even be required to put the feedstock in the gaseous or vapor phase. Neither the temperature nor the pressure used should, however, be such as to destroy the difference in transport rate across the liquid barrier-semipermeable film combination of the aliphatically-unsaturated hydrocarbons whose separation is sought, compared with that of the other components of the feed. These conditions should also not be such that physical disruption of the membrane or any other significant malfunction results.

In the present invention, we may use the metals which serve in the form of metal-containing cations to separate aliphatically-unsaturated hydrocarbons in the feed mixture through the formation of metal complexes of desired properties, and these metals include, for instance, the transition metals of the Periodic Chart of Elements having atomic numbers above 20. Included in these metals are those of the first transition series having atomic numbers from 21 to 29, such as chromium, copper, especially the cuprous ion, manganese and the iron group metals, e.g., nickel and iron. Others of the useful complex-forming metals are in the second and third transition series, i.e., having atomic numbers from 39 to 47 or 57 to 79, as well as mercury, particularly as the mercurous ion. Thus, we may employ noble metals such as silver, gold and the platinum group, among which are platinum, palladium, rhodium, ruthenium and osmium. The useful base metals of the second and third transition series include, for example, molybdenum, tungsten, rhenium and the like. Various combinations of these complexing-forming metals may also be employed in this invention, either in the presence or absence of other non-metal or non-complexing metal cations.

The metal is provided in the aqueous liquid barrier in contact with the semi-permeable membrane composite in a form which is soluble in this liquid. Thus, the various water-soluble salts of these metals can be used such as the nitrates and halides, for instance, the bromides and chlorides, fluoborates, fluosilicates, acetates, carbonyl halides or other salts of these metals which can serve to form the desired water-soluble complexes. The metal salts should not react with any components of the aliphatically-unsaturated hydrocarbon-containing feed to form an insoluble material which could block the film membrane or otherwise prevent the separation of the desired component of the feedstock. Also, in a given system, the metal is selected so that the complex will readily form and yet be sufficiently unstable so that the complex will decompose and leave the liquid barrier, thereby providing a greater concentration of the aliphatically-unsaturated hydrocarbon to be separated from the exit side of the membrane than in the feed. The concentration of the metal ions in the liquid barrier may be rather low and still be sufficient to provide an adequate complexing rate so that excessive amounts of the semi-permeable membrane surface will not be needed to perform the desired separation. Conveniently, the concentration of the complex-forming metal ions in the aqueous solution forming the liquid barrier is at least about 0.1 molar, and is preferably about 0.5 to 12 molar. Advantageously, the solution is less than saturated with respect to the complex-forming metal ions to insure that essentially all of the metal stays in solution, thereby avoiding any tendency to plug the film membrane and destroy its permeability characteristics.

When the complexing ions in the liquid barrier employed in this invention are cuprous ions, ammonium ions can be used to provide copper ammonium complex ions which are active to form a complex with the aliphatically-unsaturated hydrocarbons to be separated. We preferably supply about equimolar amounts of cuprous and ammonium ions in the liquid barrier solution, although either type of ions may be in excess. The ammonium ions can be provided in various convenient ways, preferably as an acid salt such as ammonium chloride. In order to enhance the selectivity of the copper ammonium ion complex in the separation of this invention, we may also make the liquid barrier solution more acidic, by, for instance, providing a water-soluble acid such as a mineral acid, especially hydrochloric acid in the solution. Preferably, the pH of the liquid barrier in this form of the invention is below about 5 with the acid in the solution. Since silver may form undesirable acetylides with acetylenes, the copper ammonium complex may be a more attractive complexing agent when it is desired to separate acetylenes from its various mixtures.

Instead of supplying only a noble metal for complexing the aliphatically-unsaturated hydrocarbon in the process of this invention, we may also employ mixtures of noble metal and other cations. Work has shown that as the noble metal concentration increases, the selectivity of the desired separation may be enhanced, and a portion of the noble metal may be replaced by non-noble metal or ammonium ions and selectivities generally comparable to those obtained with the same concentration of noble metal ions may be obtained. This result has been reached even though the non-noble metal or ammonium ion, when used by itself in an effort to accomplish the desired separation, may be ineffective or only marginally suitable. Accordingly, the total of such ions in the liquid barrier may be composed of a minor or major amount of either the noble metal ions or the non-noble metal, ammonium or other cations. Solutions having a major amount of the non-noble metal, ammonium or other cations not containing a noble metal will generally be less expensive, and, accordingly, the noble metal may be as little as about 10 molar percent or less of the total cations in the solution. To reduce expenses at least about 10 molar percent, preferably at least about 50 molar percent, of the total cations may be other than the noble metal cations. The non-noble or base metals are preferably of Groups II to VIII of the Periodic Chart of Elements, and especially those in the fourth and fifth periods, aluminum and magnesium. Zinc and cupric ions are preferred ones among these non-noble or base metal ions. The various cations may be provided in the liquid barrier in the form of any suitable compound such as the acid salt forms mentioned above with respect to the noble metals.

The amount of water in the liquid barrier employed in this invention may be a minor portion of the liquid phase, but preferably is a major portion or even essentially all of the liquid, on a metal salt-free basis. Thus, small or minor amounts of water, say as little as about 5 weight percent, on a salt-free basis in the liquid phase may serve to provide significant transport for the aliphatically-unsaturated hydrocarbons across the liquid barrier. Any other liquid present in the barrier is preferably water-miscible and should be chosen as not to have a substantial deleterious effect on the separation to be accomplished.

The method of this invention will be further described with reference to the following specific examples.

A closed, glass test cell was equipped with a gas inlet tube passing through the cap of the cell and extending to close to the bottom of the cell where the tube ended in a fritted gas bubbler within the liquid phase of the cell. The cell internal cross-sectional area was 4.9cm.$^2$ and the length was 20cm. The gas inlet tube was surrounded at its upper end with a feed gas outlet tube whose lower end opened into the upper part of the cell at a point just below the cell cap and above the liquid level in the cell. A separate tube for exhausting permeate gas from the cell extended nearly the length of the cell and was immersed in the liquid for most of the length of the tube. The permeate outlet tube passed through the cell cap. This tube housed a smaller purge gas inlet tube that opened into the lower portion of the permeate outlet tube. Thus, during operation, the purge gas swept essentially the entire length of the inside of the permeate outlet tube.

The hydrocarbon feed gas was charged into the aqueous liquid in the cell by way of the gas bubbler, and the exhaust or raffinate components of the gas left the cell by the gas outlet tube. The permeate outlet tube was a one-fourth inch O. D. Selas tube having pores of 0.27 microns in diameter. The outside of the Selas tube was covered with a cured coating of silicone-rubber resin (General Electric RTV-60, trademark), to form a semi-permeable membrane. The portion of the Selas tube above the liquid level was sealed so that exhausted feed gas would not enter the permeate outlet tube. Also, the portion of the permeate outlet tube outside of the cell was capped so that the product gas could be sampled for gas chromatographic analysis.

The cell was filled except for a small volume just below its cap, with an aqueous solution 1M in silver nitrate. The sweep gas contacted the inside surface of the permeate gas outlet tube, picked-up the materials leaving the membrane and then exited the cell as a product stream. The product was analyzed by gas chromatography. Permeation rates were calculated from the amount of hydrocarbon in the sweep gas, the sweep gas flow rate, and the response of the gas chromatographic detector to 1 milliliter of the product gas mixture.

The cell was used to separate ethylene from a mixed hydrocarbon gas stream while employing silver ions as the complexing metal. The feed gas was a mixture of methane, ethane and ethylene, and the gas was fed to the cell at 15 psig and was allowed to exit the cell at the rate of 5 ml./min. The purge side of the membrane tube was swept with helium at the rate of 10 ml./min. Tests were made using three Selas tubes as described above. One tube had no coating other than the silicone rubber, while a second tube had a thin film of cellulose acetate (39.8 percent acetyl) over the silicone rubber. The third tube contained a thin coating of duPont's 8063 nylon over the silicone rubber. The nylon was less hydrophilic than the cellulose acetate coating on the second tube.

The coatings were applied to the tubes by dipping the silicone rubber coated tube into a solution of the cellulose acetate or nylon. The coated tubes were then allowed to dry. The cellulose acetate solution was composed of 25 wt. percent cellulose acetate in a mixed acetone-formamide solvent (60wt. percent acetone, 40wt. percent formamide). The nylon (duPont's 8063) was applied from a 10wt. percent nylon solution in methanolchloroform solvent (50vol. percent $CH_3OH$, 50vol. percent $CHCl_3$).

The results of these tests were as follows:

TABLE I

| Hydrophilic coating on tube | Permeation rate (ml./cm.² min.) | Composition of permeate (weight percent), helium-free basis | | | |
|---|---|---|---|---|---|
| | | $CH_4$ | $C_2H_4$ | $C_2H_6$ | S.F.* |
| Feed gas composition | | 26.2 | 43.8 | 3.0 | |
| None | $32.2 \times 10^{-4}$ | 3.0 | 87.0 | 10.0 | 9.1 |
| Cellulose acetate | $7.8 \times 10^{-4}$ | .8 | 98.0 | 1.2 | 69 |
| Nylon | $3.1 \times 10^{-4}$ | 2.2 | 93.0 | 4.8 | 25 |

*S.F. = ethylene selectivity factor =

$$\frac{\text{Conc. of } C_2H_4 \text{ in permeate}}{\text{Conc. of } CH_4 + C_2H_6 \text{ in permeate}} \times \frac{\text{Conc. of } CH_4 + C_2H_6 \text{ in feed}}{\text{Conc. of } C_2H_4 \text{ in feed}}$$

The data show that the ethylene selectivity factor in the tests using the tubes having the hydrophilic coating was increased more than two-fold compared with the other run, although the permeation rate decreased.

It is claimed:

1. A method for separating aliphatically-unsaturated hydrocarbon of 2 to about 8 carbon atoms which comprises contacting a vaporous mixture containing said unsaturated hydrocarbon, with an aqueous liquid phase in contact with a first side of an essentially solid, water-insoluble hydrophobic, semi-permeable film membrane having a hydrophilic surface on said first side, said liquid phase having therein metal ions which combine with said unsaturated hydrocarbon to form a water-soluble complex, said semi-permeable membrane being essentially impermeable to said aqueous liquid and permeable to said vaporous mixture, the partial pressure of said unsaturated hydrocarbon on a second side of said semi-permeable membrane being sufficiently less than the partial pressure of said unsaturated hydrocarbon in said vaporous mixture to provide separated unsaturated hydrocarbon on said second side of said semi-permeable member, and removing said unsaturated hydrocarbon from the vicinity of said second side of said semi-permeable membrane.

2. The method of claim 1 in which the said unsaturated hydrocarbon separated has 2 to 4 carbon atoms.

3. The method of claim 2 in which said unsaturated hydrocarbon separated is ethylene.

4. The method of claim 3 in which said vaporous mixture contains ethylene in admixture with one or both of methane and ethane.

5. The method of claim 4 in which the hydrophobic film membrane is silicone polymer.

6. The method of claim 4 in which the hydrophilic surface is cellulose acetate.

7. The method of claim 6 in which the hydrophobic film membrane is silicone polymer.

8. The method of claim 4 in which the hydrophilic surface is nylon.

9. The method of claim 8 in which the hydrophobic film membrane is silicone polymer.

10. The method of claim 1 in which said metal ions are noble metal ions.

11. The method of claim 10 in which the noble metal ions are silver.

12. The method of claim 11 in which said unsaturated hydrocarbon separated has 2 to 4 carbon atoms.

13. The method of claim 12 in which the unsaturated hydrocarbon separated is ethylene.

14. The method of claim 13 in which said vaporous mixture contains ethylene in admixture with one or both of methane and ethane.

15. The method of claim 13 in which the hydrophobic film membrane is silicone rubber.

16. The method of claim 14 in which the hydrophilic surface is cellulose acetate.

17. The method of claim 16 in which the hydrophobic film membrane is silicone rubber.

18. The method of claim 14 in which the hydrophilic surface is nylon.

19. The method of claim 18 in which the hydrophobic film membrane is silicone rubber.

* * * * *